(12) United States Patent
Barsness et al.

(10) Patent No.: US 8,818,989 B2
(45) Date of Patent: Aug. 26, 2014

(54) MEMORY USAGE QUERY GOVERNOR

(75) Inventors: Eric L. Barsness, Pine Island, MN (US); Paul S. Nelsestuen, Oronoco, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 12/956,745

(22) Filed: Nov. 30, 2010

(65) Prior Publication Data
US 2012/0136850 A1 May 31, 2012

(51) Int. Cl.
*G06F 17/30* (2006.01)
*G06F 7/00* (2006.01)

(52) U.S. Cl.
USPC .......................................... 707/713; 707/745

(58) Field of Classification Search
USPC ....................................................... 707/713
See application file for complete search history.

(56) References Cited

U.S. PATENT DOCUMENTS

| | | | |
|---|---|---|---|
| 6,879,266 B1 * | 4/2005 | Dye et al. | 341/51 |
| 2003/0065688 A1 * | 4/2003 | Dageville et al. | 707/205 |
| 2007/0234366 A1 * | 10/2007 | Morich et al. | 718/104 |
| 2008/0071818 A1 * | 3/2008 | Apanowicz et al. | 707/101 |
| 2010/0106710 A1 * | 4/2010 | Nishizawa et al. | 707/714 |

OTHER PUBLICATIONS

Oracle® Database Performance Tuning Guide 11g Release 1 (11.1) B28274-02 Jul. 2008. (downloaded from below link). <<http://docs.oracle.com/cd/B28359_01/server.111/b28274.pdf>>.*
Michel et al. "Active Memory Expansion Performance", Sep. 2009, pp. 1-18, IBM Corporation, Somers, NY.

* cited by examiner

*Primary Examiner* — Kuen Lu
(74) *Attorney, Agent, or Firm* — Patterson & Sheridan LLP (57) ABSTRACT

Techniques for managing query execution based on memory usage using memory compression. Embodiments may receive a query from a requesting entity and estimate an amount of memory required to execute the query. Upon determining that executing the query would consume an impermissible amount of memory, embodiments may optimize the query by adjusting an amount of memory compression used in executing the query. The optimized query may then be executed to produce a set of query results, which may then be returned to the requesting entity.

25 Claims, 6 Drawing Sheets

MEMORY USAGE QUERY GOVERNOR

BACKGROUND

The present invention generally relates to database management, and more particularly, to managing the memory usage of queries using a query governor.

Databases are computerized information storage and retrieval systems. A relational database management system is a computer database management system (DBMS) that uses relational techniques for storing and retrieving data. An object-oriented programming database is a database that is congruent with the data defined in object classes and subclasses.

Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests (i.e., queries) are often made using high-level query languages such as the Structured Query Language (SQL). Upon receiving such a request, the DBMS may execute the request against a corresponding database, and return any result of the execution to the requesting entity.

As databases grow in size and in workload, particular queries or requests may take a substantial amount of time and resources to execute. As such, database administrators may wish to control how memory on a database system is used.

SUMMARY

Embodiments of the invention provide a method, product and system for managing query execution. The method, product and system include receiving a query from a requesting entity. Upon receiving the query, the method, product and system include calculating an estimated memory usage value for executing the received query. The estimated memory usage value is calculated based at least in part on historical memory usage data from previously processed queries. Additionally, the method, product and system include determining whether executing the query would satisfy a memory consumption condition by comparing the estimated memory usage value with a predetermined threshold amount of memory. Upon determining that executing the query would not satisfy the memory consumption condition, the method, product and system include optimizing the query to reduce an amount of memory used in executing the query.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Since many computers have a limited amount of Random Access Memory ("RAM") in which to run programs, proper memory management is important to ensure that these limited resources are effectively utilized. To this end, in a database system, database administrators may wish to restrict the amount of memory a particular query, when executed, can consume. That is, if executing a particular query would consume substantial amounts of system memory, to the detriment of the execution other queries and tasks on the system, the database administrators may wish to reject the query for execution. Such a rejection may be definitive (e.g., a message may be returned to the requesting entity, explaining the query was denied for processing) or the execution may be delayed to another time (e.g., the system may process the query once system resources become idle). This ensures that no single database query may monopolize the resources of the system.

Although the memory resources of a computer may be fixed, one technique for effectively increasing the memory resources is by compressing data stored therein. For example, assume a particular file has a storage size of 100 megabytes. If the particular file is then read into system memory, it will consume 100 megabytes of space in memory, but if the particular file is compressed at a compression rate of 50%, the compressed file will only consume 50 megabytes of space in memory. One example of such a memory compression technique is the Active Memory Expansion component available on POWER7™ platforms by International Business Machines ("IBM"). Although such a technique may increase the time required to process requests using the compressed data, because additional processing resources are used to compress and decompress the data, in many situations, the processing costs may be outweighed by the gains in memory capacity.

Embodiments of the invention may receive a query for processing from a requesting entity and, responsive to receiving the query, may calculate an estimated memory usage value for executing the query. The estimated memory usage value generally reflects an approximation of the amount of system memory that will be used in executing the query. Furthermore, embodiments may estimate this value using historical memory usage data, collected from processing previous queries. Embodiments may then determine whether to process the received query by comparing the estimated memory usage value with a predetermined threshold amount of memory. Upon determining that the estimated memory usage value exceeds the predetermined threshold amount, embodiments may optimize the query to reduce an amount of memory used in executing the query. In one embodiment, the optimization includes adjusting an amount of memory compression used in processing the query. In another embodiment, a plurality of execution plans are generated for the query, and an estimated memory usage value is calculated for each of the execution plans. An execution plan is then selected for use in executing the query, based on at least in part the respective estimated memory usage value for the selected execution plan. Once the query is optimized, the query may then be executed to produce query results, which may in turn be returned to the requesting entity.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a database management system or "DBMS") or related data available in the cloud. For example, the DBMS could execute on a computing system in the cloud and receive queries pertaining to one or more databases managed by the DBMS. In such a case, a memory usage query governor 182 could monitor incoming queries and, for each query, calculate an estimated memory usage for executing the query. If the memory usage query governor 182 determines that the estimated memory usage for a particular query exceeds a threshold amount of memory, the memory usage query governor 182 may optimize the query by adjusting an amount of memory compression used in executing the query. Doing so allows a user to submit queries from any computing system attached to a network connected to the cloud (e.g., the Internet), and helps to ensure no single query consumes an impermissible amount of memory during execution.

Figure 1A:
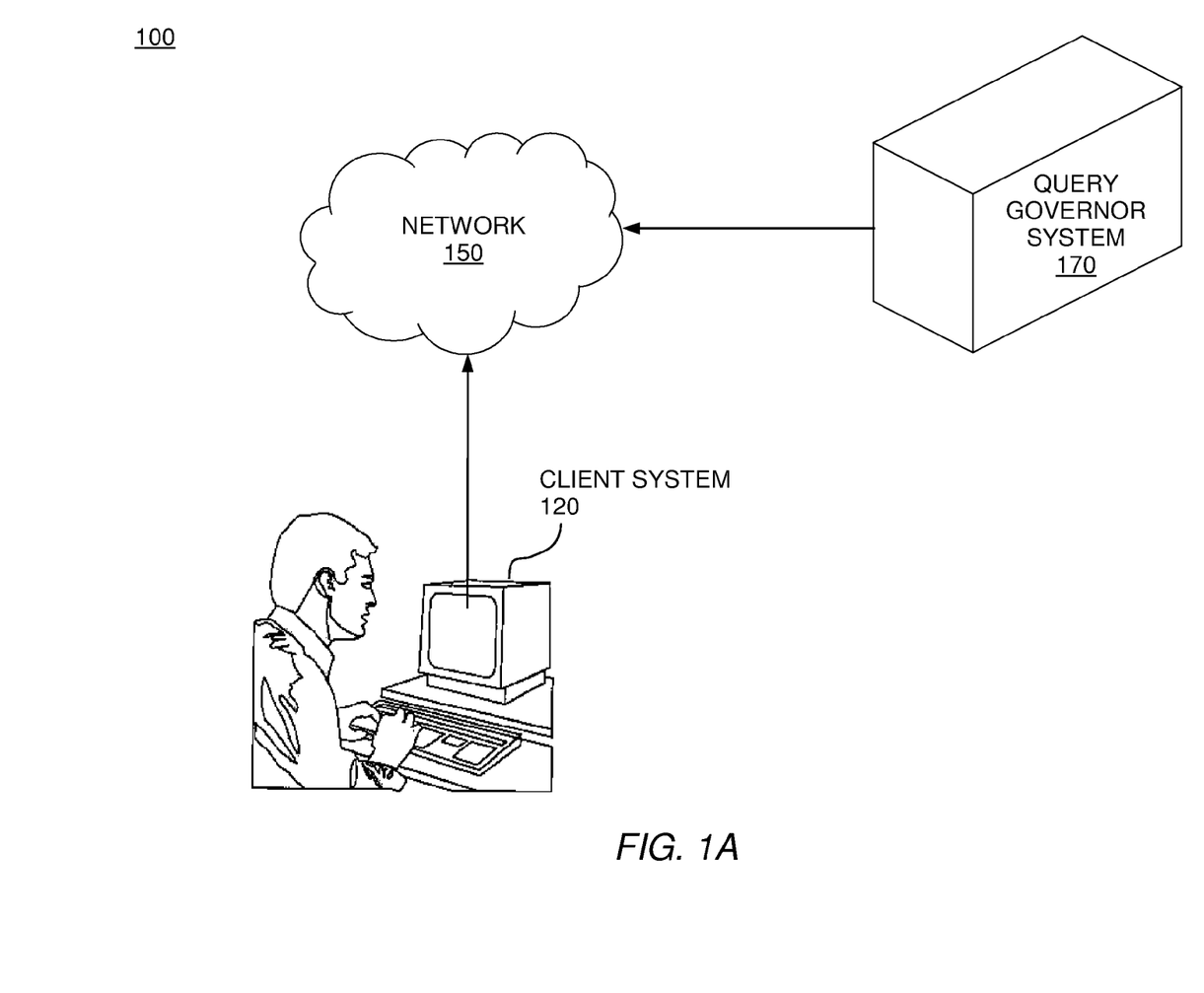
FIGS. 1A-1B are block diagrams illustrating systems configured to run a memory usage query governor, according to embodiments of the present invention.
Figure 1B:
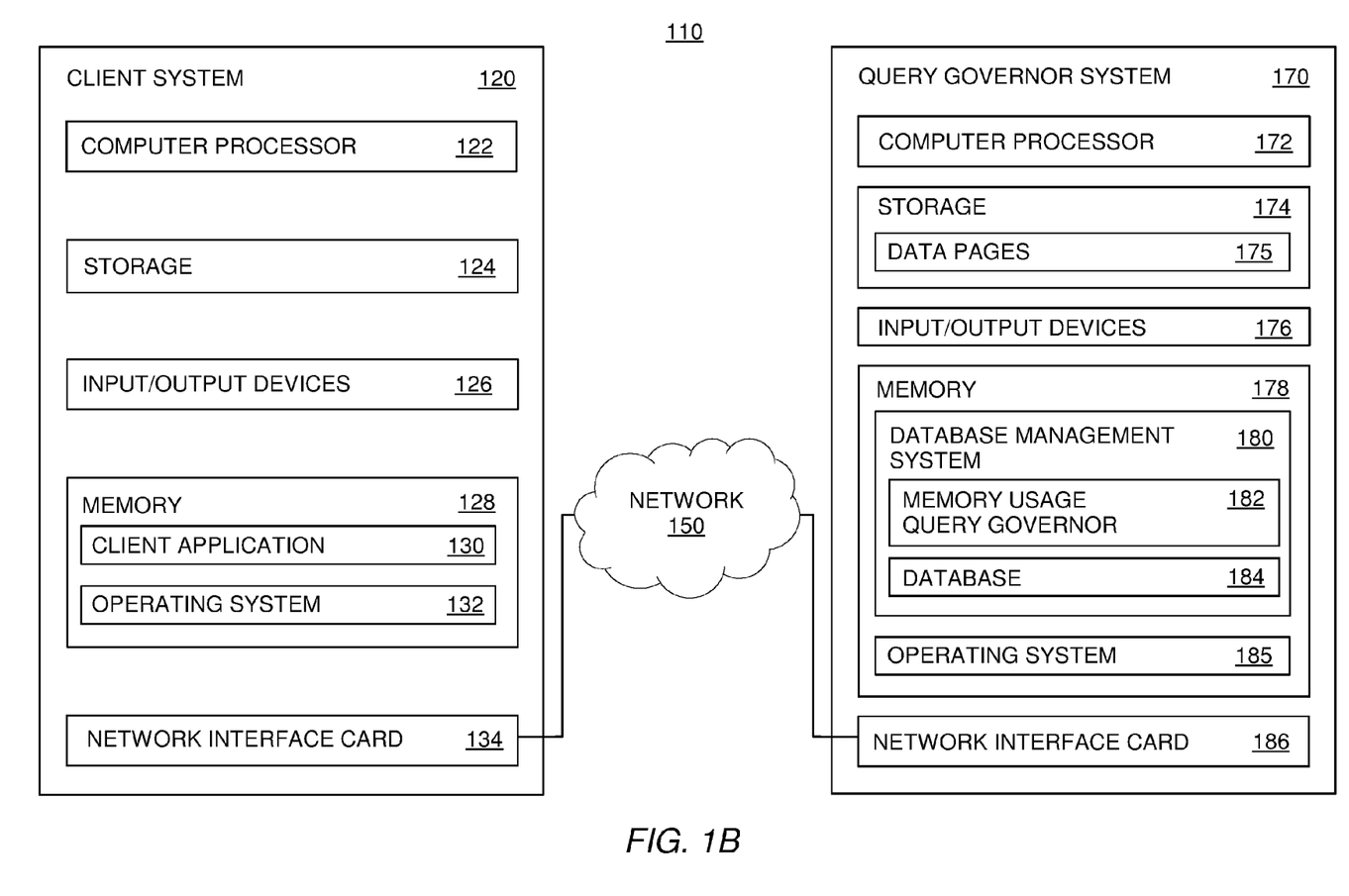

Referring now to FIGS. 1A-1B, FIGS. 1A-1B are block diagrams illustrating systems configured to run a memory usage query governor, according to embodiments of the present invention. More specifically, FIG. 1A is a block diagram illustrating a networked system for estimating and managing memory usage for query processing. As shown, the system 100 includes a client system 120 and a database server 170, connected by a network 150. Generally, the client system 120 may submit requests (i.e., queries) over the network 150 to a DBMS running on the database server 170. The term "query" denotes a set of commands for retrieving data from a stored database. Queries may take the form of a command language, such as the Structured Query Language (SQL), and enable programmers and programs to select, insert, update, and determine the location of data in the database.

Generally speaking, any requesting entity (i.e., different query types) can issue queries against data in a database. For example, software applications (such as by an application running on the client system 120), operating systems, and, at the highest level, users may submit queries to the database. These queries may be predefined (i.e., hard coded as part of an application) or may be generated in response to input (e.g., user input). Upon receiving the request, the DBMS on the database server 170 may execute the request on a database specified in the request, and then return a result of the executed request.

According to one embodiment of the invention, upon receiving a query for processing, a query governor on the query governor system 170 may calculate an estimated memory consumption value for the received query. The estimated memory consumption value generally reflects an amount (e.g., megabytes) of system memory that will be used in executing the received query. The query governor may calculate the estimated memory consumption value using historical memory usage data collected from processing previous queries. As an example, assume that three previous queries containing SELECT statements for a particular database table consumed 15 megabytes, 20 megabytes and 25 megabytes of memory when executed. If the query governor system 170 then receives another query containing a SELECT statement for the particular database table, the query governor may estimate that the query will consume 20 megabytes of memory when executed (i.e., the average of the three previous values).

Once the estimated memory consumption value is calculated, the query governor may then determine whether the query, if executed, would consume an impermissible amount of memory. The query governor may determine this by comparing the estimated memory consumption value with a predetermined threshold amount of memory. If the estimated memory consumption value exceeds the threshold amount of memory, the query governor may determine that executing the query would consume an impermissible amount of memory. In such a scenario, the query governor may perform optimization operations on the query to adjust an amount of memory compression used in executing the query. In a situation where memory compression is disabled, such an adjustment may include enabling memory compression for at least the processing of the query. In a situation where memory compression is already enabled, the adjustment may include increasing the compression rate used in processing the query (i.e., data will be compressed further). If the query governor determines the estimated memory consumption value does not exceed the threshold, the query governor may execute the received query without performing optimization operations on the query. In any event, once the query is executed, any results produced from executing the query may be returned to the requesting entity from which the query was received.

In another embodiment, upon determining the estimated memory consumption value exceeds the threshold amount of memory, the query governor may determine a plurality of execution plans for use in executing the query. Each execution plan may generally include one or more database operations that, when performed, complete the actions specified by the query. Upon calculating the plurality of execution plans, embodiments may further calculate an estimated memory consumption value for each of the execution plans. Embodiments may then select one of the execution plans for use in executing the query, based on the estimated memory consumption value calculated for the selected execution plan. Generally, embodiments may select an execution plan with a relatively low estimated memory consumption value, but may consider other factors as well. For instance, embodiments may consider an estimated execution time for each of the execution plans in addition to the estimated memory consumption value. As an example, if embodiments determine that two execution plans have an estimated memory consumption value that does not exceed the threshold amount of memory, but determine that the first execution plan will take twice as long to execute as the second execution plan, embodiments may select the second execution plan for use in executing the query. Of course, such an example is without limitation and is for illustrative purposes only, and more generally any factors consistent with the functions described herein may be considered in addition to or in lieu of the estimated execution time given in the above example.

Advantageously, by doing this, embodiments of the invention may manage the amount of memory that individual queries may consume on the database system. By doing this, embodiments may prevent a situation where a particular query consumes a substantial fraction of the system memory, to the detriment of other queries and tasks on the database system. Furthermore, embodiments of the invention may manage query execution in a way that does not simply reject the query for processing. Rather, embodiments of the invention may still process a query whose estimated memory usage exceeds the threshold by using memory compression to reduce the amount of memory used in processing the query. In another embodiment, a query execution plan that satisfies the query memory usage requirements may be selected. By doing this, embodiments process the received query while still adhering to the memory usage restrictions.

FIG. 1B is a block diagram illustrating a system configured to run a memory usage query governor, according to one embodiment of the present invention. As shown, the system 110 contains the client system 120 and the database server 170. The client system 120 contains a computer processor 122, storage media 124, I/O devices 126, memory 128 and a network interface card 134. Computer processor 122 may be any processor capable of performing the functions described herein. The client system 120 may connect to the network 150 using the network interface card 134. Furthermore, as will be understood by one of ordinary skill in the art, any computer system capable of performing the functions described herein may be used.

Illustratively, memory 128 contains a client application 130 and an operating system 132. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The client application 130 is generally capable of generating database queries. Once the client application 130 generates a query, the query may be submitted to a server (e.g., DBMS 180) for execution, using the network 150. The operating system 132 may be any operating system capable of performing the functions described herein.

The database server 170 contains a computer processor 172, storage media 174, I/O devices 176, memory 178 and a network interface 186. Computer processor 172 may be any processor capable of performing the functions described herein. As shown, storage media 174 contains data pages 175. The data pages 175 generally contain one or more rows of data. In one embodiment of the invention, data contained in the data pages 175 is associated with one or more key values in the database 184. I/O devices 226 may represent a variety of input and output devices, including keyboards, mice, visual displays, printers and so on. The database server 170 may connect to the network 150 using the network interface card 186. Furthermore, as will be understood by one of ordinary skill in the art, any computer system capable of performing the functions described herein may be used.

In the pictured embodiment, memory 178 contains an operating system 180 and a database management system (hereinafter "DBMS") 180. Although memory 178 is shown as a single entity, memory 178 may include one or more memory devices having blocks of memory associated with physical addresses, such as random access memory (RAM), read only memory (ROM), flash memory or other types of volatile and/or non-volatile memory. The DBMS 180 contains a memory usage query governor 182 and a database 184. The operating system 185 may be any operating system capable of performing the functions described herein.

As discussed above, when the DBMS 180 receives a query for processing, the query governor 182 may estimate a memory consumption value for processing the query. Such a memory consumption value may reflect, for instance, how much data the DBMS 180 will retrieve from the data pages 175 in storage 174 into the memory 178, as part of executing operations associated with the query. The query governor 182 may then use the estimated memory consumption value to determine whether to execute the query without further optimization. The query governor 182 may determine this by, for example, comparing the memory consumption value to a predetermined threshold amount of memory.

If the estimated memory consumption value exceeds the threshold, the query governor 182 may optimize the query to adjust an amount of memory compression used in executing the query. Such optimize may include enabling memory compression for processing the query, if memory compression is disabled, or may include increasing the compression rate used in processing the query. Once the query is optimized, the DBMS 180 may execute the query against the database 184 to produce a set of query results. The DBMS 180 may then return the set of query results to the requesting entity from which the query was received.

In one embodiment, the query governor 182 optimizes the query so that the amount of memory consumed in processing the query is at or near the threshold amount. By doing this, the query governor 182 may ensure that the query executes using a permissible amount of memory, while avoiding any unnecessary delay in processing the query. That is, because additional memory compression may result in additional processing activity, queries executed using a high amount of memory compression may take longer to execute than queries executed using a low amount or no memory compression. Thus, by optimizing queries such that executing the query uses an amount at or near the threshold amount, the query governor 182 may enforce a memory usage policy while minimizing any delay to query processing.

In one embodiment, the query governor 182 may consider other factors when determining the threshold amount of memory that may be used in processing the query. Such factors may include, without limitation, the origin of the query, a priority value associated with the query, and a class of the query. For instance, assume that there are two applications which submit queries to the DBMS 180: a mission-critical real-time application with a high priority value and a logging application for collecting database statistics with a low priority value. In such an example, the query governor 182 may allow queries received from the mission-critical application to consume a larger amount of memory than queries received from the logging application, in order to use less memory compression in processing queries received from the higher-priority mission-critical application and accordingly to expedite the processing of these queries. That is, because the use of memory compression may consume additional processing resources on the query governor system 170, queries that are processed using a greater a mount of memory compression may take longer to process than queries processed using a lesser amount or no memory compression. Thus, by enabling the processing of queries received from higher-priority application to use more system memory, the query governor 182 may process these queries more quickly. At the same time, the query governor 182 enables the processing of queries received from the lower-priority application, even if such queries would ordinarily consume an impermissible amount of memory, through the use of memory compression techniques in executing the queries.

Figure 2:
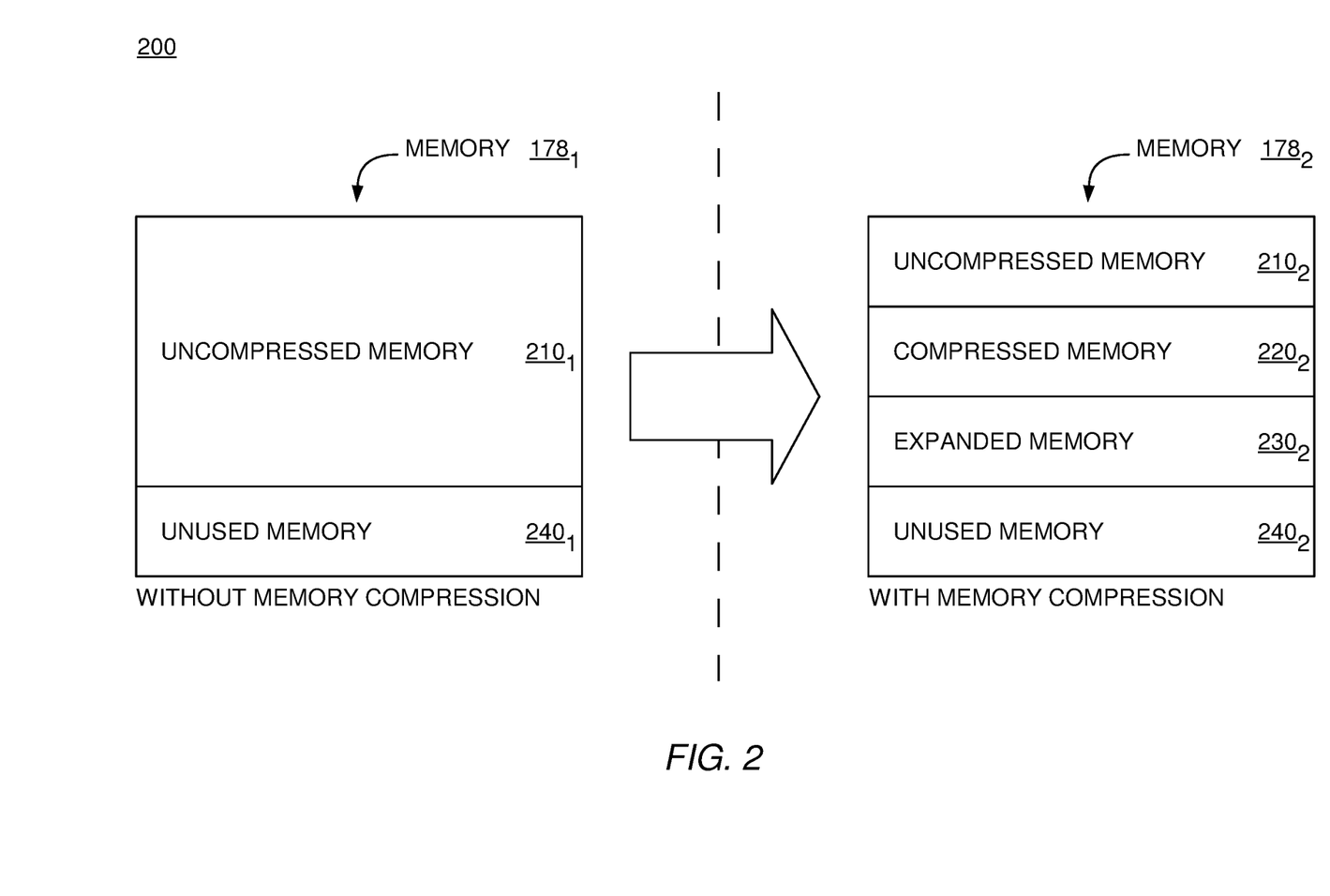
FIG. 2 is a block diagram illustrating the effects of memory compression, according to one embodiment of the present invention.

FIG. 2 is a block diagram illustrating the effects of memory compression, according to one embodiment of the present invention. In the depicted example, note that the memory $178_1$ without memory compression enabled has the same physical data storage capacity as the memory $178_2$ with memory compression enabled. As shown, the memory $178_1$ contains a portion of uncompressed memory $210_1$ and a portion of unused memory $240_1$. The uncompressed portion of memory $210_1$ may store data used by one or more applications that is not compressed. The unused pool $240_1$, in turn, represents an unused data capacity of the memory $178_1$, in which no data is currently stored.

The memory $178_2$, in contrast, contains an uncompressed portion $210_2$, a compressed portion $220_2$, an expanded portion $230_2$ and an unused portion $240_2$ of memory. In this example, the memory $178_2$ effectively contains the same data as the memory $178_1$, but does so using memory compression. Thus, in the depicted example, the uncompressed memory $210_2$ relates to a portion of the uncompressed memory $210_1$ Likewise, the compressed memory $220_2$ relates to the remaining portion of the uncompressed memory $210_1$. That is, due to the use of memory compression, the data from uncompressed memory $210_1$ may be stored in uncompressed memory $210_2$ and compressed memory $220_2$ which, when combined, are smaller in size than the uncompressed memory $210_1$.

Advantageously, by using memory compression, embodiments of the invention may effectively create the expanded memory pool $230_2$, which may in turn be used to store additional data, either compressed or uncompressed. For example, a DBMS may use the expanded memory $230_2$ to store additional data during fetches to a storage media 174. Additionally, such memory compression not only expands available memory, but because the expanded memory $230_2$ may be used for other purposes, may also reduce paging on the database system as a result. Advantageous, because paging often leads to a greater delay than compressing and decompressing data, the memory compression may improve the performance of the database system as well. Furthermore, although FIG. 2 shows the various portions of memory as being contiguous, in practice, memory regions allocated to a pool may be fragmented. One of ordinary skill in the art will recognize, however, that in this example it is the amount of memory 178 occupied by each portion that is significant.

Figure 3:
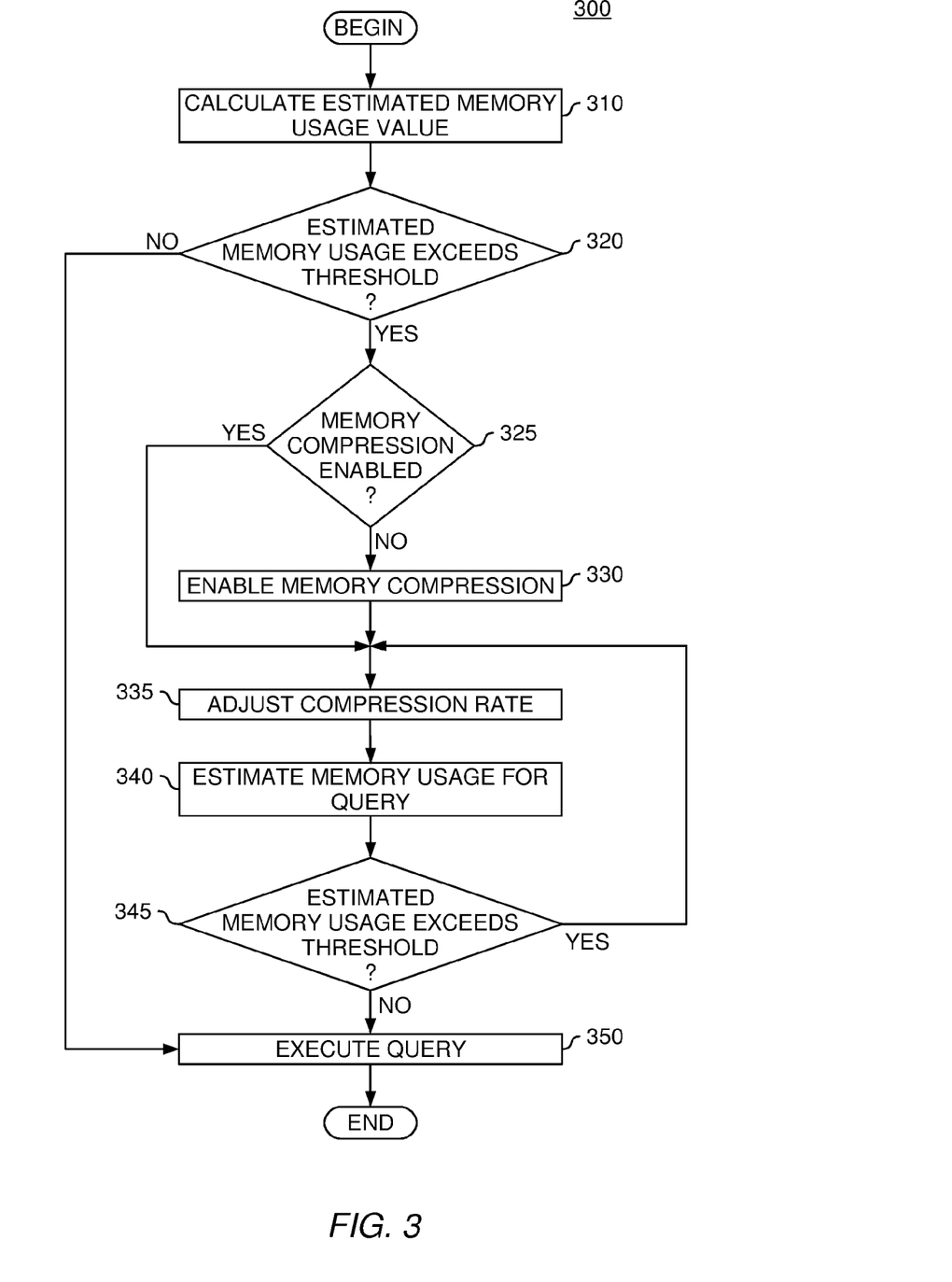
FIG. 3 is a flow diagram illustrating a method for managing the memory usage of a query, according to one embodiment of the present invention.

FIG. 3 is a flow diagram illustrating a method for managing the memory usage of a query, according to one embodiment of the present invention. As shown, the method 300 begins at step 320, where the query governor 182 calculates an estimated memory usage value for a received query. As discussed above, the estimated memory usage value generally approximates an amount of system memory (e.g., memory 178) that will be used in processing the query. Furthermore, the query governor 182 may calculate this value based on historical memory usage data, collected from previously processed queries.

Once the estimated memory usage value is calculated, the query governor 182 determines whether the memory usage value exceeds a threshold amount of memory (step 320). Generally, the threshold amount defines how much memory the execution of a particular query may consume. Such a threshold amount may set, for example, by the database administrators and the value of such an amount should be reflective of the database environment. In an embodiment where the threshold amount is a fixed value (e.g., 10 megabytes of memory), the value should generally be proportional to the total memory in the database system (e.g., the size of memory 178 in the query governor system 170). In another embodiment, the threshold amount may be a percentage value of the system memory (e.g., 10% of the size of memory 178). The threshold amount may also be defined based on the workload of the database system. For example, in a system where a relatively large number of queries are issued against the database in a fixed period of time, the database administrators may set a relatively low threshold amount of memory, to prevent any single query from over-consuming the memory resources of the database system. As a second example, in a system where a relatively small number of queries are issued against the database in the same fixed period of time, the database administrators may set a relatively high threshold amount of memory. That is, in this example, because there are fewer query execution operations consuming the system memory, each query execution operation may be allowed to use a larger portion of the system memory.

Additionally, the threshold amount may vary depending on one or more other factors, such as an identity of the requesting entity submitting the query. For example, a particular environment may contain two applications which submit queries to the DBMS: a high-priority application and a low-priority application. In such an environment, the threshold amount of memory for queries submitted by the high-priority application may be greater than the threshold amount of memory for queries submitted by the low-priority application. By doing this, embodiments may ensure that queries received from the high-priority application are processed relatively quickly and with minimal delay due to the use of memory compression. That is, because compressing and decompressing values in system memory consumes additional processing resources, such additional processing may result in longer processing times for queries that are processed using memory compression. Accordingly, by allocating a higher threshold amount of memory to queries received from the high-priority application, embodiments may reduce the amount of memory compression used in processing these queries to ensure these queries are processed more quickly.

The queries received by the DBMS may also be associated with a priority value. The priority value generally indicates a priority of processing the query in a relatively short amount of time. In one embodiment, the queries themselves may explicitly specify a priority value for the query (e.g., using a particular SQL tag in the query). In another embodiment, the query governor 182 may derive the priority value for a particular query based on one or more factors, such as which database constructs are accessed in processing the query and a type of the query. As an example, if the query references a particular table in the database, the query governor 182 may determine that the query is a relatively high-priority query.

Such a priority value may then be used to determine whether to adjust the amount of memory compression used in processing the query. For instance, although the estimated memory usage value calculated for the aforementioned high-priority query may exceed the threshold amount of memory, the query governor 182 may nonetheless allow the query to execute without memory compression to ensure that the query executes in a relatively short amount of time. As a second example, the query governor 182 may adjust the amount of memory compression used in executing the query, but may still use less memory compression in executing the query due to the high priority value of the query. By doing this, embodiments may mitigate any delay in the processing of the query, while still enforcing the memory management policy on the database system.

In one embodiment of the invention, the query governor 182 may further consider a relative priority between the priority value associated with a query and the threshold amount of memory. That is, in such an embodiment, varying weights may be assigned to the priority value and the threshold amount of memory indicating a relative importance of each. As an example, where the priority value is considered more important than the threshold amount of memory, the query governor 182 may determine that a high-priority query should be executed without using memory compression, even if the estimated memory usage value for that query greatly exceeds the threshold amount. As a second example, where the threshold amount of memory is given a higher priority relative to the priority value, if the estimated memory usage value for a high-priority query exceeds the threshold amount of memory by a small amount, the query governor 182 may nonetheless determine that the query should be executed using memory compression, since the threshold amount is treated with greater importance. Of course, the above examples are for illustrative purposes only, and one of ordinary skill in the art will quickly recognize that any number of other factors and combinations of factors may be used instead to determine the threshold amount.

Upon determining the estimated memory usage value exceeds the threshold amount, the query governor 182 then determines whether memory compression is enabled for processing the received query (step 325). Upon determining memory compression is not enabled, the query governor 182 enables memory compression for processing the query (step 330). Once memory compression is enabled, the method 300 enters a loop from steps 335-345, where generally the query governor 182 adjusts the memory compression rate for use in executing the query until the query may be executed within the threshold amount of memory. The query governor then adjusts the memory compression rate for processing the query (step 335). Initially, the query governor 182 may first set the compression rate to a default initial value. More generally though, any algorithm for adjusting the compression rate consistent with the functionality described herein may be used.

The query governor 182 then calculates an estimated memory usage value for the query using the adjusted compression rate (step 340). Upon calculating the estimated memory usage value, the query governor 182 determines whether the estimated memory usage value exceeds the threshold amount of memory (step 345). If the query governor 182 determines the estimated memory usage value still exceeds the threshold amount, the loop begins again at step 335, where the query governor 182 increases the memory compression rate used in processing the query. If instead the query governor 182 determines the estimated memory usage value does not exceed the threshold amount, the DBMS 180 executes the query with the adjusted memory compression rate (step 350). Likewise, if at step 320 the query governor 182 determines the estimated memory usage value does not exceed the threshold amount, the DBMS 180 executes the query without adjusting the memory compression amount in processing the query (step 350). Once the DBMS 180 executes the query, the method 300 ends.

Advantageously, the method 300 helps to ensure that queries executed by the DBMS 180 adhere to any memory usage restrictions and do not over-consume the resources of the database system. In other words, the method 300 prevents individual queries from consuming a substantial amount of system memory, to the detriment of the processing of other queries. Furthermore, by considering factors such as the identity of the requesting entity submitting the query (e.g., a high priority software application), embodiments may allow the processing of certain queries to consume more system resources than the processing of other queries. By doing this, embodiments may be customized to fit a particular environment and to account for any different treatment between applications or users in the environment.

Figure 4:
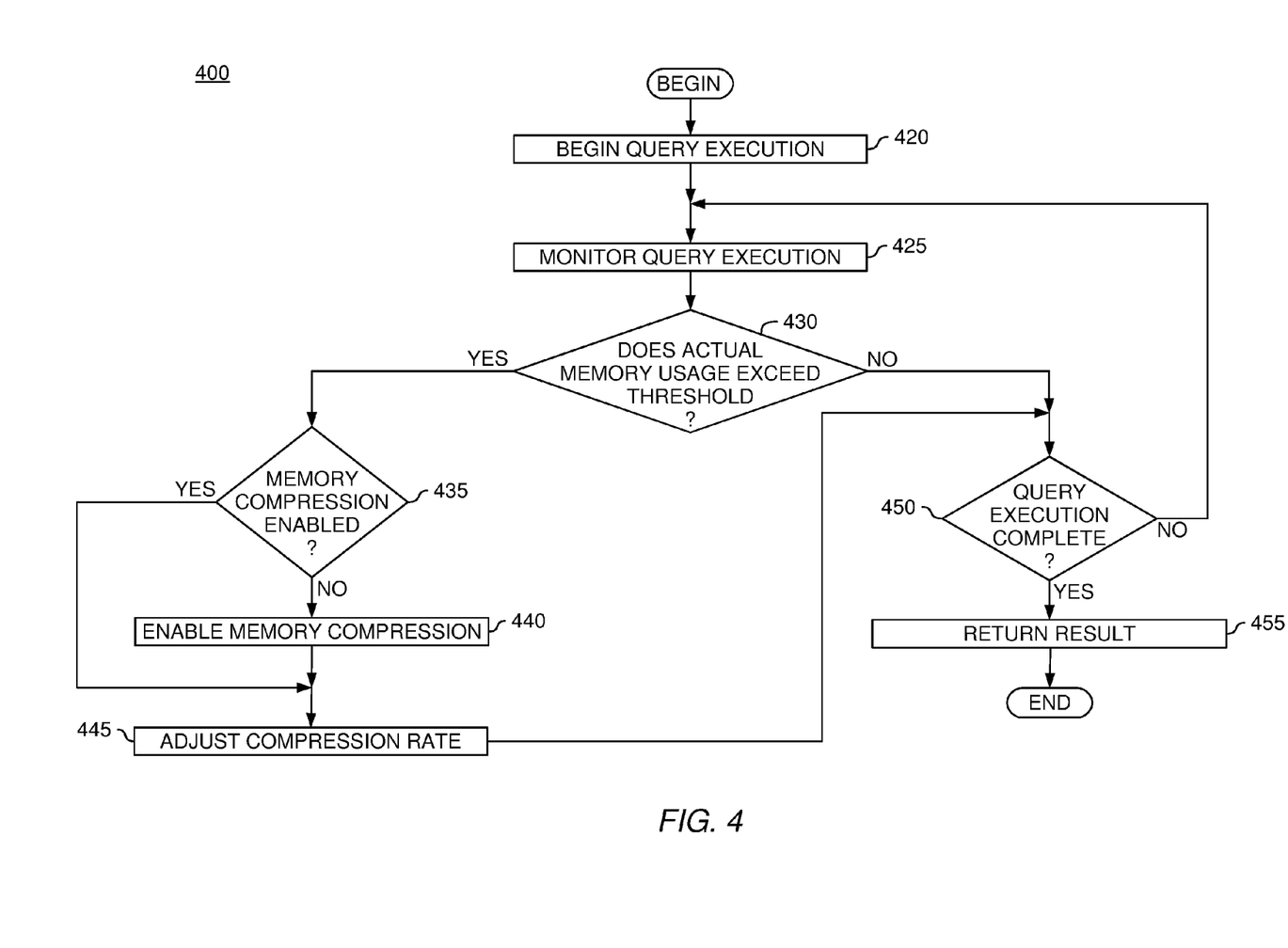
FIG. 4 is a flow diagram illustrating a method for managing the memory usage of a query, according to one embodiment of the present invention.

FIG. 4 is a flow diagram illustrating a method for managing the memory usage of a query, according to one embodiment of the present invention. As shown, the method 400 begins at step 420, where the DBMS begins executing a particular query against a database. Once query execution has begun, the query governor 182 monitors the execution of the query to determine an amount of memory used in processing the query (step 425). The query governor 182 then determines whether the actual memory used in executing the query exceeds a threshold amount of memory (step 430). If the query governor 182 determines the actual memory usage exceeds the threshold amount, the query governor then determines whether memory compression is currently enabled for processing the query (step 435). The query governor 182 then enables memory compression if memory compression was not already enabled (step 440). Once memory compression is enabled for processing the query, the query governor 182 adjusts the compression rate used in processing the query (step 445). Generally, the query governor 182 should set the compression rate to a rate calculated to reduce the actual memory usage used in executing the query to a value below the threshold amount of memory.

Once the compression rate is adjusted, the query governor 182 determines whether the particular query has finished executing (step 450). Likewise, if at step 430 the query governor 182 determines the actual memory usage does not exceed the threshold amount, the query governor 182 then determines whether query execution is complete (step 450). If the query has not yet finished executing, the method reverts to step 425, where the query governor 182 continues monitoring the execution of the query. If instead the query has finished executing, the DBMS 180 then returns any query results produced by executing the query to the requesting entity from which the query originated (step 455). Once the query results are return, the method 400 ends.

Figure 5:
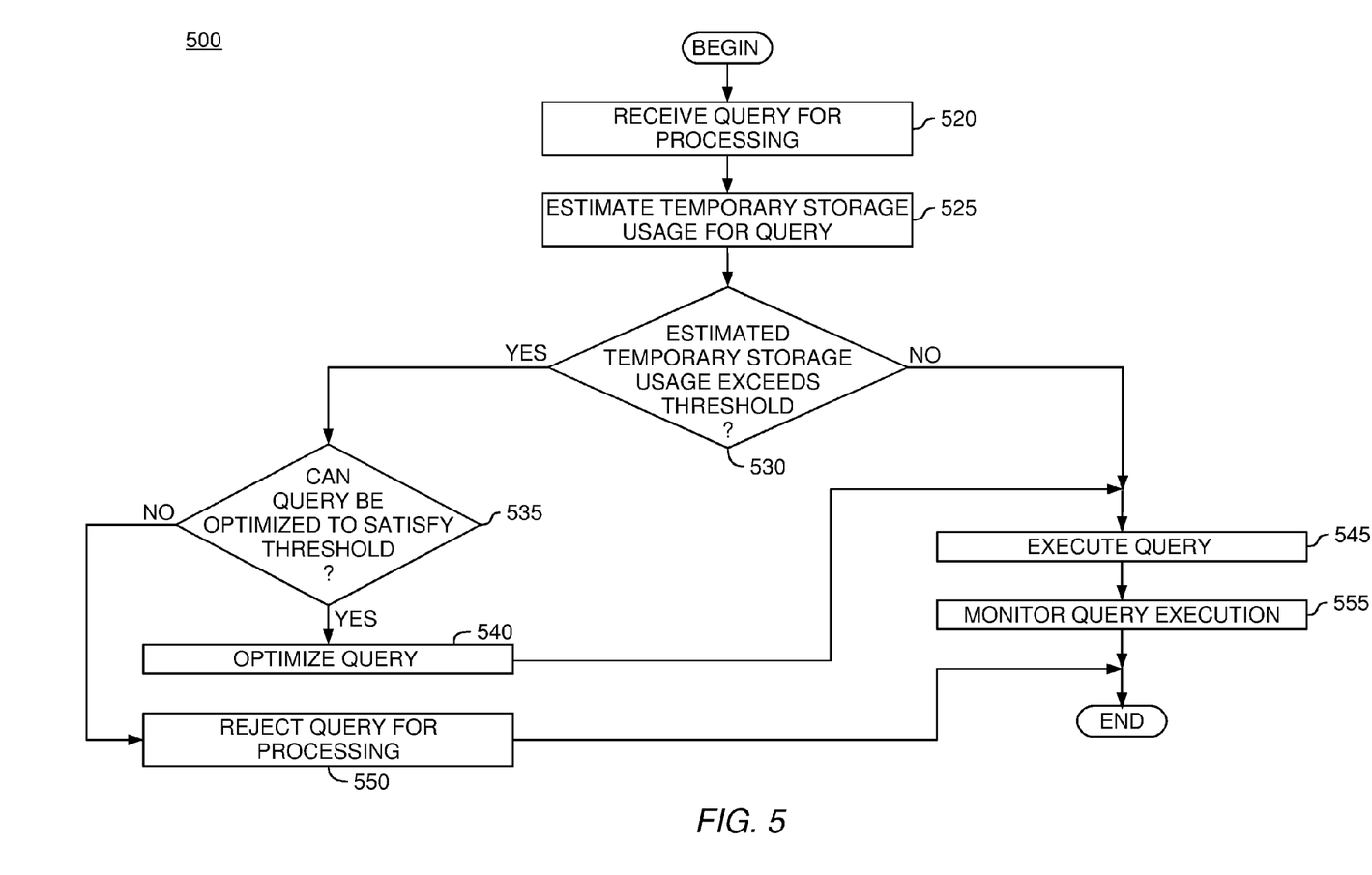
FIG. 5 is a flow diagram illustrating a method for managing the memory usage of a query, according to one embodiment of the present invention.

FIG. 5 is a flow diagram illustrating a method for managing the memory usage of a query, according to one embodiment of the present invention. The method 500 begins at step 520, where the DBMS 180 receives a query for processing. Upon receiving the query, the query governor 182 estimates an amount of temporary storage (e.g., memory 178) that will be used in processing the query (step 525), and determines whether the estimated amount of temporary storage exceeds a threshold amount of memory (step 530). If the query governor 182 determines that the estimated amount of temporary storage exceeds the threshold amount, the query governor 182 then determines whether the query can be optimized in a way that would satisfy the threshold amount (step 535). As an example, if memory compression is not yet enabled for processing the query, the query governor 182 may determine that the query may be optimized to satisfy the threshold by enabling memory compression.

If the query governor 182 determines the query may be optimized in a way that satisfies the threshold, the query governor 182 optimizes the query to reduce an amount of memory used in executing the query (step 540). As discussed above, the query optimization may include adjusting an amount of memory compression used in processing the query. Such an adjustment may further include enabling memory compression, in the event memory compression was initially disabled, and may also include adjusting a compression rate associated with processing the query. In another embodiment, the query governor 182 may optimize the query for execution by generating a plurality of execution plans for the query, each specifying a different set of database operations that may be performed to execute the query. Generally, at least one of the execution plans will use some amount of memory compression in processing the query. The query governor 182 may then calculate an estimated memory usage value for executing the query according to each of the execution plans. Once the estimated memory usage values are calculated, the query governor 182 may then select one of the execution plans for use in executing the query, based on the calculated estimated memory usage values.

Once the query is optimized, the DBMS 180 executes the optimized query (step 545). In the event that the query was optimized by selecting one of a plurality of execution plans, the DBMS 180 executes the query according to the selected execution plan. The query governor 182 may then monitor the execution of the query in order to ensure that the actual amount of memory used in executing the query does not violate the threshold amount (step 555). In one embodiment of the invention, such monitoring takes place according to the method 400 illustrated in FIG. 4 and described above.

Likewise, if memory compression is enabled and the compression rate cannot be increased further, the query governor 182 may determine that the query cannot be optimized in a way that satisfies the threshold amount of memory. If the query cannot be optimized to satisfy the threshold, the query governor 182 rejects the query for processing (step 550). Such a rejection may include transmitting a notification to the requesting entity from which the query originated. The notification may include an indication that the query was rejected for processing, and may further include an explanation of why the query was rejected.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for managing query execution, comprising:
   calculating an estimated memory usage value for executing a query, based at least in part on historical memory usage data relating to previously processed queries, wherein the estimated memory usage value approximates a total amount of memory that will be used when the query is executed, and wherein the estimated memory usage value is calculated before the received query is executed;
   determining whether executing the query would satisfy a memory consumption condition by comparing the estimated memory usage value with a predetermined threshold amount of memory; and
   upon determining that executing the query would not satisfy the memory consumption condition, and by operation of one or more computer processors:
      determining one or more optimizations for the query adapted to reduce an amount of memory used when the query is executed, such that the memory consumption condition will be satisfied when the query is executed;
      optimizing the query based on the determined one or more optimizations; and
      executing the optimized query to produce a first set of query results.

2. The computer-implemented method of claim 1, wherein the query was received from a requesting entity, and further comprising:
   upon executing the optimized query, returning the first set of query results to the requesting entity; and
   upon determining that executing the query would satisfy the memory consumption condition:
      executing the query to produce a second set of query results; and
      returning the second set of query results to the requesting entity.

3. The computer-implemented method of claim 1, wherein optimizing the query further comprises:
   determining a first rate of compression for use in optimizing the query; and
   compressing at least a portion of memory used in executing the query at the first rate of compression, such that the amount of memory used in executing the query is reduced and such that the memory consumption condition is satisfied.

4. The computer-implemented method of claim 3, wherein optimizing the query further comprises:
   determining whether memory compression is enabled for executing the query; and
   upon determining memory compression is disabled, enabling memory compression for at least the execution of the received query.

5. The computer-implemented method of claim 3, further comprising:
   while the query is executing, determining that the memory consumption condition is no longer satisfied when an actual amount of memory used in executing the query exceeds the predetermined threshold amount of memory; and
   increasing the rate of compression from the first compression rate to a second compression rate, wherein the second compression rate specifies that data associated with executing the query should be further compressed relative to the first compression rate.

6. The computer-implemented method of claim 1, further comprising:
   determining a priority value associated with the received query that describes how much delay is acceptable in executing the query, and
   wherein determining whether executing the query would satisfy the memory consumption condition is further based on the determined priority value associated with the received query.

7. The computer-implemented method of claim 6, wherein determining whether executing the query would satisfy the memory consumption condition is further based on a relative priority between the predetermined threshold amount of memory and the determined priority value associated with the received query.

8. The computer-implemented method of claim 1, wherein optimizing the query further comprises:
   determining a plurality of query execution plans for executing the received query;
   calculating an estimated memory usage value for each query execution plan in the plurality of query execution plans; and
   selecting a particular query execution plan for use in executing the query, based on the estimated memory usage value for the particular query execution plan.

9. The computer-implemented method of claim 1, further comprising:
   executing the query;
   monitoring the execution of the optimized query to determine an actual memory usage value; and
   upon determining the actual memory usage value exceeds the predetermined threshold amount of memory, compressing an amount of memory used in executing the query at a first rate of compression in order to reduce the amount of memory used in executing the query and such that the memory consumption condition is satisfied.

10. A computer program product for managing query execution, comprising:
   a computer-readable memory having computer readable program code embodied therewith, the computer readable program code comprising:
      computer readable program code to calculate an estimated memory usage value for executing a query, based at least in part on historical memory usage data relating to previously processed queries, wherein the estimated memory usage value approximates a total amount of memory that will be used when the query is executed, and wherein the estimated memory usage value is calculated before the received query is executed;
      computer readable program code to determine whether executing the query would satisfy a memory consumption condition by comparing the estimated memory usage value with a predetermined threshold amount of memory; and
      computer readable program code to, upon determining that executing the query would not satisfy the memory consumption condition:
         determine one or more optimizations for the query adapted to reduce an amount of memory used when the query is executed, such that the memory consumption condition will be satisfied when the query is executed;
         optimize the query to reduce an amount of memory used in executing the query; and
         execute the optimized query to produce a first set of query results.

11. The computer program product of claim 10, wherein the query was received from a requesting entity, and further comprising:
   computer readable program code to, upon executing the optimized query, return the first set of query results to the requesting entity; and
   computer readable program code to, upon determining that executing the query would satisfy the memory consumption condition:
      execute the query to produce a second set of query results; and
      return the second set of query results to the requesting entity.

12. The computer program product of claim 10, wherein the computer readable program code to optimize the query further comprises:
   computer readable program code to determine a first rate of compression for use in optimizing the query; and
   computer readable program code to compress at least a portion of memory used in executing the query at the first rate of compression, such that the amount of memory used in executing the query is reduced and such that the memory consumption condition is satisfied.

13. The computer program product of claim 12, wherein the computer readable program code to optimize the query further comprises:
   computer readable program code to determine whether memory compression is enabled for executing the query; and
   computer readable program code to, upon determining memory compression is disabled, enable memory compression for at least the execution of the received query.

14. The computer program product of claim 12, further comprising:
   computer readable program code to, while the query is executing, determine that the memory consumption condition is no longer satisfied when an actual amount of memory used in executing the query exceeds the predetermined threshold amount of memory; and
   computer readable program code to increase the rate of compression from the first compression rate to a second compression rate, wherein the second compression rate specifies that data associated with executing the query should be further compressed relative to the first compression rate.

15. The computer program product of claim 10, further comprising:
   computer readable program code to determine a priority value associated with the received query that describes how much delay is acceptable in executing the query, and
   wherein the computer readable program code to determine whether executing the query would satisfy the memory consumption condition is further based on:
      the determined priority value associated with the received query; and
      a relative priority between the predetermined threshold amount of memory and the determined priority value associated with the received query.

16. The computer program product of claim 10, wherein the computer readable program code to optimize the query further comprises:
   computer readable program code to determine a plurality of query execution plans for executing the received query;
   computer readable program code to calculate an estimated memory usage value for each query execution plan in the plurality of query execution plans; and
   computer readable program code to select a particular query execution plan for use in executing the query, based on the estimated memory usage value for the particular query execution plan.

17. The computer program product of claim 10, further comprising:
   computer readable program code to execute the query;
   computer readable program code to monitor the execution of the optimized query to determine an actual memory usage value; and
   computer readable program code to, upon determining the actual memory usage value exceeds the predetermined threshold amount of memory, compress an amount of memory used in executing the query at a first rate of compression in order to reduce the amount of memory used in executing the query and such that the memory consumption condition is satisfied.

18. A system, comprising:
   a computer processor; and
   a memory containing a program that, when executed on the computer processor, performs an operation for managing query execution, comprising:

calculating an estimated memory usage value for executing a query, based at least in part on historical memory usage data relating to previously processed queries, wherein the estimated memory usage value approximates a total amount of memory that will be used when the query is executed, and wherein the estimated memory usage value is calculated before the received query is executed;

determining whether executing the query would satisfy a memory consumption condition by comparing the estimated memory usage value with a predetermined threshold amount of memory; and upon determining that executing the query would not satisfy the memory consumption condition, and by operation of one or more computer processors:

determining one or more optimizations for the query adapted to reduce an amount of memory used when the query is executed, such that the memory consumption condition will be satisfied when the query is executed;

optimizing the query based on the determined one or more optimizations; and executing the optimized query to produce a first set of query results.

19. The system of claim 18, wherein the query was received from a requesting entity, and further comprising:

upon executing the optimized query, returning the first set of query results to the requesting entity; and upon determining that executing the query would satisfy the memory consumption condition:

executing the query to produce a second set of query results; and returning the second set of query results to the requesting entity.

20. The system of claim 19, wherein optimizing the query further comprises:

determining a first rate of compression for use in optimizing the query; and compressing at least a portion of memory used in executing the query at the first rate of compression, such that the amount of memory used in executing the query is reduced and such that the memory consumption condition is satisfied.

21. The system of claim 20, wherein optimizing the query further comprises:

determining whether memory compression is enabled for executing the query; and upon determining memory compression is disabled, enabling memory compression for at least the execution of the received query.

22. The system of claim 20, the operation further comprising:

while the query is executing, determining that the memory consumption condition is no longer satisfied when an actual amount of memory used in executing the query exceeds the predetermined threshold amount of memory; and increasing the rate of compression from the first compression rate to a second compression rate, wherein the second compression rate specifies that data associated with executing the query should be further compressed relative to the first compression rate.

23. The system of claim 18, the operation further comprising:

determining a priority value associated with the received query that describes how much delay is acceptable in executing the query, and wherein determining whether executing the query would satisfy the memory consumption condition is further based on:

the determined priority value associated with the received query; and a relative priority between the predetermined threshold amount of memory and the determined priority value associated with the received query.

24. The system of claim 18, wherein optimizing the query further comprises:

determining a plurality of query execution plans for executing the received query;

calculating an estimated memory usage value for each query execution plan in the plurality of query execution plans; and selecting a particular query execution plan for use in executing the query, based on the estimated memory usage value for the particular query execution plan.

25. The system of claim 18, the operation further comprising:

executing the query;

monitoring the execution of the optimized query to determine an actual memory usage value; and upon determining the actual memory usage value exceeds the predetermined threshold amount of memory, compressing an amount of memory used in executing the query at a first rate of compression in order to reduce the amount of memory used in executing the query and such that the memory consumption condition is satisfied.

* * * * *